March 9, 1965   S. N. BLACKMAN   3,172,289
GLASS THERMOMETER
Filed Jan. 16, 1962   2 Sheets-Sheet 1

INVENTOR.
Seymour N. Blackman
BY
ATTORNEYS

United States Patent Office 3,172,289
Patented Mar. 9, 1965

3,172,289
GLASS THERMOMETER
Seymour N. Blackman, % Precision Medical Instrument, Inc., Englewood, N.J.
Filed Jan. 16, 1962, Ser. No. 166,596
6 Claims. (Cl. 73—371)

This invention relates to the marking of glass thermometers.

Although my invention will be described hereinafter by way of example with respect to glass clinical thermometers, I wish to mention at this point that my invention is not so limited but pertains to the marking of all types of glass thermometers, that is to say, commercial glass thermometers as well as clinical glass thermometers. Examples of commercial glass thermometers are: chemical melting point thermometers, water bath thermometers, outdoor thermometers, and boiler thermometers which in general are characterized by a glass stem of any shape of cross-section, e.g., circular, and by the presence or absence of a trap, and by temperature graduations on the stem itself.

A clinical, i.e. fever, thermometer of either the rectal, oral or stubby type conventionally comprises a straight shaft of roughly triangular cross-section with a rectilinear axial capillary bore therein that terminates at one end in a thin-walled reservoir bulb. The bulb contains a liquid which expands upon the application of heat, such, for instance, as mercury, the expansion, and, therefore, the temperature, being measured by the rise of a column of the liquid in the capillary bore. Such thermometers customarily are made of transparent material, and almost invariably of glass. The actual cross-section of the thermometer is such that a rounded corner of the shaft acts as a lens to magnify the tiny diameter of the bore in which the liquid rises. It should be observed that in some thermometers, usually commercial thermometers, where the capillary bore is somewhat larger than that of a clinical thermometer, it is not necessary to employ such a lens portion, and, therefore, the stem may be of circular cross-section.

Glass thermometers are made by loading the bulb with mercury and sealing the distal end, the end remote from the bulb) of the capillary bore. For permanent accuracy it is customary to age the unmarked thermometer before calibrating and marking the stem. Aging is best provided for today artificially, as by annealing, in which event a calibration pocket is secured to this distal end. The reason that aging or annealing obtains permanent accuracy is that stressed, i.e. unannealed, glass has internal stresses present. These occur throughout the bulb and its junction to the stem. When the thermometer ages these stresses tend principally to relieve themselves at room temperature over a period of months. The relief of the stresses is accomplished by a change in the dimensions of the thermometer, such change being in the realm of 0.1% in the bulb area. Such an order of change in dimensions in the bulb causes a consequent movement of mercury in the stem in the realm of about 50%. After annealing the mercury above the trap at room temperature is shaken into the calibration pocket and said pocket is removed. After sealing, the thermometer is pointed, this being a term used in the art to indicate the placement of impermanent markings on the shaft of the thermometer at the heights of the mercury column in the bulb at two predetermined temperatures, for example, 98° F. and 104° F. in a clinical thermometer. Pointing desirably is practiced for two reasons: one, because the quantity of mercury varies from one thermometer to another and, two, because the bores of all thermometers are not exactly alike. However, assuming each bore to be substantially uniform in diameter throughout its length, pointing by precisely locating the heights of the mercury column at two different temperatures enables a set of scale graduations to be placed on the thermometer shaft in correct position with regard to temperature.

Thereafter, according to prior practices, the pointed thermometer is coated with a resist, that is to say a layer of material which is impervious to an etching reagent that subsequently will be employed. A typical material is wax. Now the waxed and pointed thermometer is placed in a marking machine which, with the aid of an operator, removes the resist coating, that is to say, the wax, where and in the shape of the markings to be made. The marking machine comprises, inter alia, a pantograph for transferring to the thermometer transverse linear scale graduations the spacing between scale lines of which is adjusted to conform to the spaces between the points. This particular operation is time consuming and tedious due to the variations in the spaces between the points on the thermometer shafts and to the necessity of readjusting the pantograph for each change in the distance between points, as well as to the necessity of removing the resist for a considerable number of scale lines.

Subsequent to effecting the pantographic markings the thermometer is etched with a suitable reagent, such as hydrofluoric acid, which erodes the glass shaft over the areas (including scale graduations, numerical graduations and various other indicia) where the resist coating has been removed and leaves depressions thereat. The etch-marked thermometer now can be stripped of the wax coating and the intaglio markings that remain can be rendered more readily visible by filling the same with an opaque material such, for example, as a silicone pigment.

This previous practice and the apparatus for carrying out the same, as well as the thermometers that resulted therefrom, are subject to sundry drawbacks. For instance, the processing of each of the thermometers individually, and particularly the steps of waxing, of subsequently cutting the scale graduations with a pantographic marking apparatus, of etching, of dewaxing and of pigment filling and wiping in the wax, is quite costly and time consuming. Moreover the use of hydrofluoric acid, although it represents a manufacturing risk which is present in many industries, is, as is well known, quite dangerous. Still further, great care and skill is required to minimize cosmetic defects on the stem due to undercutting of the wax coating.

In addition to the foregoing manufacturing drawbacks, the article produced as aforesaid has several use disadvantages. Thus, etched clinical thermometers tend to be unsatisfactory because the intaglio markings can accumulate dirt, feces, mucous and bacteria in tiny crevices which are not easily washed out or sterilized. The individual etched grooves themselves can amass unwanted foreign materials even before the filling pigment erodes or chips out. In addition, the filled-in pigment ultimately will be leached out or will flake away due to repeated immersions in sterilizing solutions, washings and flushings of the thermometers so that the thermometers no longer can be read with ease. Furthermore, only mild sterilizing solutions such as tinctures of green soap can be used, since solutions having phenolic or oxidizing reagents tend to deteriorate the filling pigment. Wiping after use forces the dirt into the intaglio markings rather than removing the same. Over and above these latter disadvantages an etched thermometer is inherently weak because the removal of the glass for marking sets up focal points for breakage.

It previously has been proposed to overcome the above various disadvantages by marking the shafts of clinical thermometers with the aid of staining agents. According to the process thus suggested flush markings were applied by heating which was localized at the individual discrete markings and furthermore was localized at the skin (external surface) of the shaft. More specifically, the flush marking was applied by depositing a staining composition on the shaft in the shape of marks to be effected and then the shaft was placed in a high frequency field of electric energy which was tuned to the resonance of the staining composition but not to the resonance of glass whereby the staining composition was heated, as by dielectric heating, but the shaft itself was not heated as a whole. This localized heating was necessary due to the fact that a high temperature is required for flush stain marking of glass and a previously filled and otherwise completed thermometer could not be heated to such a temperature in its entirety without exploding the same and/or distorting the readings. Nevertheless such proposed method has not attained commercial acceptance because the local heating of the glass shaft at its skin by conduction at many discrete points where the stain marking was being effected set up local strains throughout the thermometer shaft and rendered it highly susceptible to breaking under the slightest of shocks. Hence, although the desirability of marking of fever thermometers by staining is recognized the same has not, up to the present time, been acceptable.

It is an object of my present invention to provide a glass thermometer which is stain marked but which is not subject to the foregoing drawbacks and has the following advantages: it can be wiped clean, it can be sterilized in strong oxidizing agents, it will not entrap dirt, the markings are as permanent as the thermometer itself, and the markings will not act as focal points for breakage.

More particularly, it is an object of my present invention to provide a glass thermometer which is stain marked but which has not been locally heat-treated at a plurality of tiny discrete zones that are adjacent differently heat-treated zones so as to set up stress boundaries between the zones which make the thermometer fragile.

It is another object of my present invention to provide a glass thermometer of the character described which has all the advantages of stain marking but none of its previous disadvantages.

It is another object of my present invention to provide a glass thermometer of the character described which has been stain marked without creating local internal stresses.

It is another object of my present invention to provide a glass thermometer of the character described which can be manufactured quickly with the use of less labor and with the use of less expensive equipment.

It is another object of my present invention to provide a method for making a glass thermometer of the character described which eliminates the tedious time consuming step of waxing, pantographic removal of a resist coating at scale graduation markings, numeral markings, back markings and serial number markings prior to the performance of an etching step, dewaxing, filling and wiping.

It is another object of my present invention to provide a thermometer of the character described which can be made by a method that eliminates the use of highly dangerous etchants for corrosive marking of glass.

It is another object of my present invention to provide an apparatus for marking a thermometer of the character described which apparatus consists of relatively few and simple parts and is easy, inexpensive and simple to make and use.

It is another object of my present invention to provide an apparatus of the character described which is semi-automatic in operation.

It is another object of my present invention to provide a method for marking thermometers of the character described in which a clear, even, dark, serial identification marking is formed in the thermometer shaft by staining. In this latter connection it is to be observed that the provision of thermometer markings of serial identification numbers by staining presents a special problem since these markings differ for every thermometer and thus are unlike scale graduation marks or numeral graduation marks which, since they are repeated, can be applied with a stencil. Serial number markings, on the other hand, are most conveniently applied with the aid of decalcomania transfers of the staining composition. Such compositions are not, upon transfer, in intimate contact with the surface of the glass and, therefore, do not form stains of a sufficient depth and contrast upon a processing which does suffice to properly stain stencil applied graduations of numbers and scale lines.

Accordingly, pursuant to an ancillary object of my invention I provide an improved process for applying clear darkly stained serial numbers by decalcomanias in the same process that applies clear dark stain markings for stencil graduations of numbers and scales.

Other objects of my invention in part will be obvious and in part will be pointed out hereinafter.

My invention accordingly consists in the features of construction, combination of elements, arrangements of parts, and series of steps which will be exemplified in the thermometer, machine and method hereinafter described, and of which the scope of application will be indicated in the appended claims.

In the accompanying drawings, in which I have shown one of the various possible embodiments of my invention.

The initial steps in the manufacture of a thermometer pursuant to my present invention are the same as those practiced in manufacturing a thermometer marked by etching. That is to say, there first is provided a conventional straight glass thermometer shaft 10 having a central rectilinear capillary bore 12. For the purpose of illustration this bore has been shown oversize in some of the figures but it is to be understood that the same is tiny and of the usual diameter. A length of shaft is provided which is long enough to make two thermometers. The center is dilated to thin the wall thereof and expand the diameter of the bore. The expanded portion is cut transversely and to each ensuing funnel-shaped section there is sealed a preformed thin-walled bulb 14. The bore at the other end of the shaft remains open. An expanded cavity (for later use in formation of a trap) is formed in the bore a short distance above the bulb. The bulbed shaft is loaded with mercury and raised to a predetermined temperature which is sufficient to elevate the mercury column in the bore up to the open end. All excess mercury thereby is ejected from the bore and is brushed from the open end. Thereafter the open end is sealed. At some stage of its manufacture after sealing the usual trap 15 is formed by transversely collapsing the expanded cavity.

In the distal end sealing operation the formerly open distal end of the shaft remote from the bulb, is provided with the usual expansion and calibration pocket. When the thermometer now is permitted to cool the interior thereof will contain mercury above which a vacuum is present.

Next the thermometer which now contains mercury, and which has a reservoir bulb at one end and an expansion and calibration pocket at the other end, is annealed in a conventional manner so that the residual stress after cooling is not in excess of 10 pounds per square inch. By way of example, the annealing may be practised by raising the temperature of the thermometer quite rapidly, for example in about fifteen minutes, to within the annealing temperature range of the glass employed, e.g. to between 820° F. and 860° F. The thermometer is held at this temperature for a suitable length of time to relieve stress and then is permitted to cool in the customary manner to below the stress temperature range, e.g., by passing through said range (about 750° F.–800° F.) rather slowly, the rate being slow enough so that the thermometer has a residual stress after cooling which does not exceed 10 pounds per square inch. It has been assumed in the foregoing description that the thermometer shaft is made of glass having a stress temperature of approximately 785° F. This is more or less standard for the glass used for thermometers which typically is a Corning Normal thermometer lead glass, Jena type 16,111 or equivalent. The bulb is made of Corning Normal glass.

In other words with a glass having a stress temperature of about 785° F. the thermometer is annealed by raising its temperature rather rapidly to above its stress temperature but below the deformation temperature of the glass and then holding the thermometer at such elevated temperature until the stresses therein are substantially relieved. It often is desirable, this being well known to the art, to hold the thermometer above its stress temperature for as long as several hours since the longer it is held at this elevated temperature the better it will be annealed. The higher the annealing temperature the more rapidly will the annealing take place. Thus if the annealing temperature is in the neighborhood of about 860° F. the annealing time can be reduced to as little as fifteen minutes whereas if the annealing temperature is in the range of 790° F. the annealing may proceed for as long as a day. On the other hand higher annealing temperatures tend to undesirably affect the shape of the shaft. The actual temperature employed will depend upon the degree of accuracy required of the finished thermometer and in general more expensive and accurate thermometers will be aged for the longer periods of time at temperatures barely above the stress temperature.

It will be appreciated by those skilled in this art that the physical dimensions of the thermometer alter slightly during annealing while the internal stresses are being relieved by annealing so that a fully annealed thermometer will retain its shape and size for many years in contrast to a nonannealed or poorly annealed thermometer which will gradually change its size over a period of time to relieve the stresses which otherwise would have been removed by annealing. Such change in physical dimensions of a thermometer in the absence of annealing will substantially vary the readings of a thermometer so much to render it unusable.

It also should be appreciated that because of the annealing and because of the slight physical differences in the dimensions of the internal capillary bores and reservoir bulbs, different thermometers will behave slightly differently. Moreover, in particular, the heights of the mercury columns in the capillary bores of different thermometers will vary somewhat from thermometer to thermometer. This variation averages about three tenths of an inch between 98° and 104° F.

Next, with the thermometer at room temperature, if the reservoir is not completely filled with mercury the thermometer is centrifuged with the bulb outermost. Now the thermometer is reversed and centrifuged at a lower speed sufficient to draw the mercury in the bore above the trap into the expansion and calibration pocket.

Up to this point the process which I have been describing is conventional. Now, in accordance with my invention, I remove the expansion and calibration pocket and form an expansion chamber 16 which is smaller than the conventional expansion and calibration pocket. A conventional expansion and calibration pocket is about 0.1 cc. or somewhat larger, whereas the expansion chamber 16 preferably is considerably smaller, e.g., about from one-half to one twenty-fifth such volume, although this is not critical, as long as sufficient space is provided for expansion of the mercury during the baking step hereinafter to be described. The expansion and calibration pocket is removed by flame heating the thermometer stem immediately below said pocket and pulling off said pocket, the capillary bore sealing itself in the process. Now while the distal end of the stem still is hot the reservoir bulb is heated to expand the mercury just enough to enlarge said still hot distal end of the bore so as to expand the distal end of the bore into the shape of the expansion chamber 16.

Due to the variation in heights of the mercury column, hereinabove mentioned, in order to correctly place scale graduations on any given thermometer at the proper temperature locations and with the proper spacings therebetween it first is necesary to "point" the individual thermometers after annealing and provision of the expansion chamber 16 so that the particular thermal characteristics of each thermometer can be accurately determined and noted thereon. The pointing operations is performed by heating the therometers to two different temperatures, e.g. 98° F. and 104° F. and by placing temporary markings 18 on the shafts of the thermometers at each of these two points. These markings may be made with a crayon which will leave a mark on glass and is fabricated from a material that is heat decomposable at a temperature well below the stress temperature of thermometer glass, i.e. is heat decomposable below 785° F. For instance, the temporary marking may be made with a colored crayon consisting of a pigmented wax that will volatilize well below 780° F. Alternatively the pointing marks 18 may be made with a lacquer, e.g. an organic solid such as cellulose acetate fluidified by an organic solvent, e.g. amyl acetate, and opacified with a colored pigment. Such a lacquer will set quickly and will volatilize below 785° F.

Using the point marks 18 as guides a heat decomposable staining composition is applied in the shape of scalar graduation markings, numerical graduation markings and identification markings (names and/or trademarks) at proper spots on the external surface of the thermometer shaft. These staining markings are placed in their usual sites on the three semi-flat (externally convex) sides of the shaft. The spaces between the scale graduation staining markings and between the numerical graduation staining markings and the location of the staining markings are so adjusted in a manner which will be described in detail hereinafter that the 98° F. scale and numerical staining markings will coincide with the 98° F. temporary marking point 18 and the 104° F. scale and numerical staining markings will be at the other temporary marking point 18.

Figure 7:
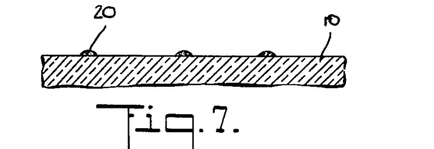
FIG. 7 is a highly enlarged fragmentary view of a small portion of a thermometer shaft adjacent the external surface thereof and illustrating a staining composition applied to said surface.
Figure 8:
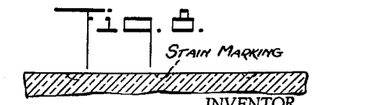
FIG. 8 is a view similar to FIG. 7 but showing the thermometer after the same has been heated so as to cause the stain to penetrate therein.

The sundry markings of staining material, to wit, the transverse scalar graduation staining lines indicating degrees and two-tenths of degrees and the numerical staining markings, constitute discrete deposits 20 in the shapes of the marks to be effected. Each of these deposits is of the usual heat-decomposable staining composition which principally constitutes a metallic heat-decomposable compound. A suitable compound is a metallic halide, for instance, copper chloride or silver chloride, preferably the latter. When a composition containing such a compound is heated adjacent the surface of glass the compound upon decomposition liberates silver or copper in a nascent state. In this condition the metal is characterized by its ability to penetrate an adjacent vitreous surface in its immediate vicinity and to form a visible stain beneath said surface so as to thereby effect a mark which duplicates in appearance the pattern in which the deposits were placed.

A metallic compound is selected which is heat-decomposable as aforesaid at a temperature below the stress temperature of the glass employed.

The staining deposits 20 are placed on the thermometer shaft in the desired pattern and in the desired spacing by any suitable method which will locate the proper points of the staining markings in registry with the corresponding points of the temporary markings 18. As will be described hereinafter, a preferred method pursuant to my present invention is by means of a silk screen or any other form of stencil which is flexible and resilient (elastic).

The heat-decomposable metallic composition can be printed through the stencil or screen simply as a powder, e.g. with the aid of a brush or electrostatic deposition. Nevertheless at the present stage of the art the preferred method of effecting the staining deposits 20 is by the so-called "silk screen" process, for the proper achievement of which the heat-decomposable metallic composition is incorporated in a fluid or semi-fluid carrier so as to form an ink of suitable body and viscosity for stencil printing.

A typical carrier is a synthetic plastic and a solvent for the same. The solvent will evaporate after the stain marking is printed through the screen so as to form the deposits 20 and before the heating step takes place which decomposes the metallic compound. A typical suitable synthetic plastic is cellulose acetate and typical suitable solvents are ethyl acetate and acetone.

Another suitable ink is an ink in which the heat-decomposable metallic compound is carried by a matrix, a satisfactory and typical matrix being particles or a lake of ferrous oxide ($Fe_2O_3$). The metallic compound is incorporated in the matrix in any suitable manner. For instance, a water-soluble salt of the metal involved, such as silver nitrate, is dissolved in water. Then the matrix, ferrous oxide, is added to the solution in powder form. The solution is mechanically agitated to uniformly disperse the ferrous oxide particles and then silver chloride is precipitated on said particles by adding hydrochloric acid to the solution. The heat-decomposable metallic compound and the composite matrix can be incorporated in a carrier such as a pasty oil base or the composite matrix and compound can be incorporated in a lacquer carrier such as a synthetic plastic and a solvent.

The thermometer, which now is reservoir bulbed at one end, contains mercury, is newly expansion bulbed at the other end, and has markings of a heat decomposable staining composition applied at the proper locations to the external surface of its shaft, is raised to staining temperature, i.e. baked. That is to say the entire thermometer is raised to staining temperature. This is done to avoid the local high temperature effects and consequent stress which would be created if just the regions of the thermometer shaft in the local vicinity only of the heat decomposable staining composition were heated to staining temperature. It is particularly to be observed that by heating the entire thermometer to staining temperature the creation of local stresses is avoided.

The staining is performed at a temperature, which as noted above, is below the annealing temperature, and very preferably is below the stress temperature, of the glass employed, in this instance below 785° F.

On the other hand it is desirable to carry out the staining at a high temperature inasmuch as this enables the stain to penetrate deeply and provide a nicely contrasted dark marking. Thus when using silver chloride as the heat decomposable metallic compound, either with or without a ferrous oxide matrix base a desirable staining temperature is 760° F. By way of example, the thermometers bearing the staining composition are heated up to 760° F. in a period of fifteen minutes, are held at 760° F. for forty minutes, are cooled 160° F. at a rate of 1° F. a minute to 600° F. and thereafter are exposed to the open air at room temperature. These rates of heating and cooling are not in and of themselves critical but as later will be seen, the combination of temperatures and rates and times for the initial annealing and subsequent baking is critical.

The marked thermometer now is characterized by stain markings so that it is not subject to the disadvantages of etched markings and moreover the thermometer constitutes a substantially uniformly annealed glass shaft which annealing has not been disturbed by the application of heating during staining and indeed, to the extent that the temperature approached the stress temperature, has been additionally uniformly annealed.

Figures 2, 4, 5, 6, 9, 10, 11:
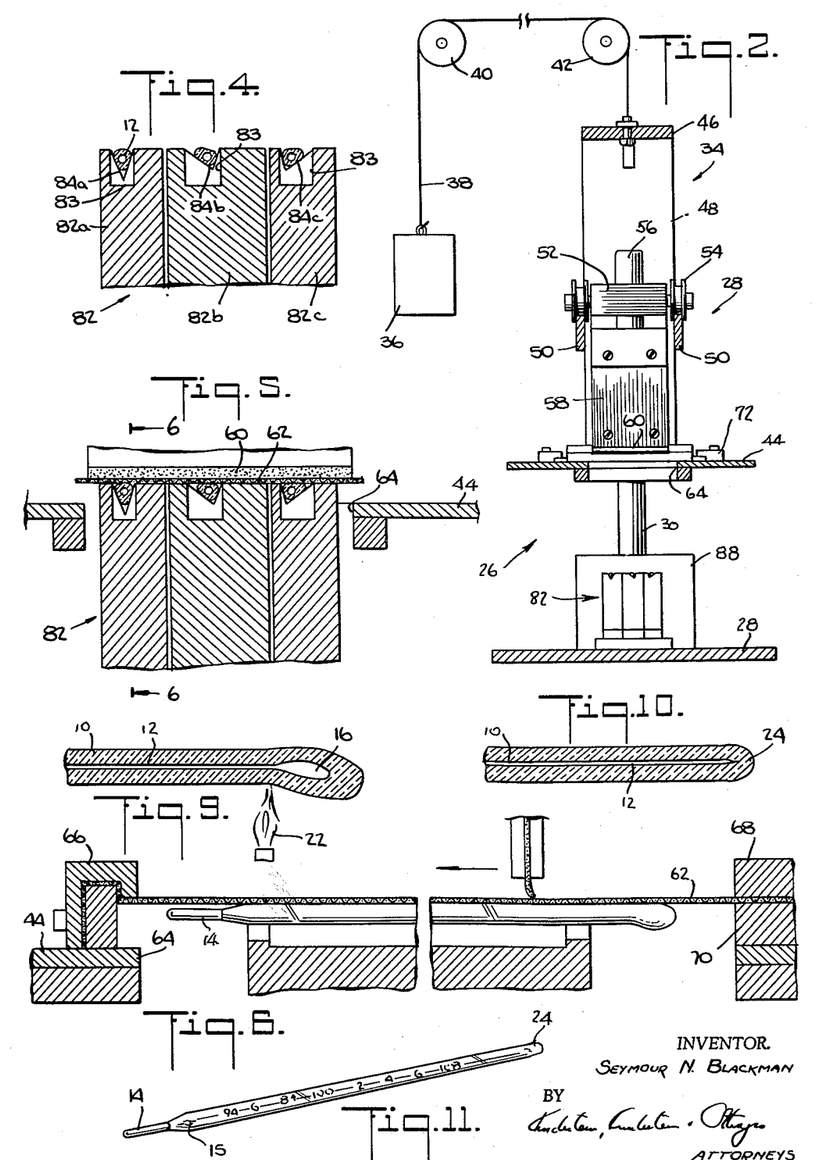
FIG. 2 is a transverse sectional view through said apparatus, the same being taken substantially along the line 2—2 of FIG. 1.
FIG. 4 is an enlarged sectional view taken substantially along the line 4—4 of FIG. 1.
FIG. 5 is a view similar to FIG. 4 but showing the machine with the stencil screen in operative position.
FIG. 6 is a sectional view taken substantially along the line 6—6 of FIG. 5.
FIG. 9 is a sectional view through an end of a thermometer and illustrating the step of heating the distal end preparatory to resealing the capillary bore below the expansion chamber and removing the latter.
FIG. 10 is a view similar to FIG. 9 illustrating the thermometer after the expansion chamber has been removed.
FIG. 11 is a perspective view of a finished thermometer embodying my present invention.

The expansion chamber 16 now is removed after sealing the bore below the same, for example, as shown in FIG. 9, by heating the shaft to softening temperature of the glass, below the expansion chamber, as with the aid of a flame 22, and pulling off the distal tip of the shaft. Inasmuch as the glass is semi-fluid under the application of the heat supplied by the flame, the bore will be sealed below the pulled-off expansion chamber before the latter is removed whereby to prevent admission of air into the vacuum above the mercury in the bore. Alternately the expansion chamber can be removed by heating and collapsing the same. The finished distal tip 24 will have the appearance shown in FIG. 10 and the finished thermometer is shown in FIG. 11.

I wish to call attention to the fact that, if desired, the thermometer may be sold with the expansion chamber 16 retained, in which event the finished thermometer has the ability, atypical of ordinary clinical thermometers, to be heat sterilized without exploding. After sterilization the mercury that accumulates in the expansion chamber can be restored to the reservoir bulb by centrifugation. Moreover, it should be observed that my improved thermometer lends itself to heat sterilization because its complete and thorough annealing ensures repetitive readings without change after each sterilization.

As is conventional, the markings on one semi-flat (outwardly convex) side of the termometer consist of a series of transverse short lines indicating degrees and two-tenths of a degree and the markings on another semi-flat side consist of a series of numerals properly registered with the linear scalar graduation markings. There also usually is a set of markings on the third semi-flat side of the thermometer, these last markings being general identification markings such for instance as the name and/or trademark or symbol of the manufacturer or distributor. In addition and particularly with high grade thermometers such as the present ones it is desirable to have a specific serial identification number for each thermometer. Serial numbers change from individual thermometer to individual thermometer so that they do not lend themselves well to application of the heat decomposable material to the shaft of the thermometer by stenciling. It will be obvious that it would be economically infeasible to provide a fresh stencil for each serial number. Nor is it desirable to apply the ink, including the heat decomposable matrix compound, by stamping as with the aid of a sequential numbering stamp, since it has been observed that stain numbers thus placed do not have distinct and sharp outlines. Moreover, it would not be desirable after having accomplished all of the advantages of a stained thermometer with uniform annealing, to destroy these by creating the number identification markings through etching or through stain marking with local heating.

Therefore, pursuant to an ancillary feature of my present invention, the identification marking is applied by staining but not through stenciling. Rather such marking is applied through the use of decalcomanias, that is to say, transfers. Decalcomania sheets may be obtained commercially upon which a matrix composition incorporated in a carrier such as an oil paste is printed in the form of a series of numbers on a plastic pellicle. The compound, of course, is a heat decomposable matrix staining composition. The numbers thus placed on the pellicle are imprinted with the aid of type, silk screens, or the like printing means so that the numbers will be distinctly defined. The plastic pellicle in turn is carried by a base sheet, being adhered to the sheet by a water-soluble cement such as is conventionally employed with decalcomanias, e.g. gum arabic or methylethylcellulose. The decalcomania carrying the serial numbers is cut up into bits each with a different number thereon. When it is desired to remove the number from the bit together with the associated bit of pellicle, the bit of decalcomania containing a number from the set and the associated bit of the pellicle and base sheet are immersed in water whereupon the bit of the pellicle is separated from the base sheet bit and can be transferred to the shaft of the thermometer in the site where the serial number is to be stained.

Although the application of the decalcomania-carried heat transferable staining composition marking can be effected after the annealing step is completed and before the thermometer shaft is raised to heat straining temperature, such arrangement is not the most desirable inasmuch as it has been found that the numbers from an applied decalcomania do not provide a dark stain when such numbers are subjected only to staining temperature. On the other hand I have discovered, and it is an ancillary feature of my invention, that a desired depth of staining can be obtained with heat decomposable decalcomania-transferred straining compositions if the compositions are applied to the shaft before rather than after the annealing step. It will be observed that it would not be proper to apply the scale graduations before the annealing step due to the fact that the change in physical dimensions of the thermometer bulb during annealing will cause too great a shift in the location of said markings relative to the height of the mercury column in the capillary bore at any given temperature. But the same objection is not applicable to identification markings since their position relative to the height of the mercury column is of no consequence.

It will be apparent that the baking treatment for staining which treatment follows the previous annealing treatment should be carried out in a fashion such as not to affect the calibration of the thermometer by more than a commercially acceptable tolerance. In general, this desidable result is effected by performing the second heat treatment, i.e., the baking heat treatment for staining, in a fashion such that the stress in the thermometer is approximately the same after baking as it was after annealing.

Customarily, a thermometer will be considered satisfactorily annealed if the stress therein is such that after standing for long periods of time, e.g., months, at room temperature, the calibration thereof does not vary by more than a commercially acceptable tolerance. I have found that the degree of annealing which achieves such comparative permanance of graduations is one which leaves a residual stress not in excess of 10 pounds per square inch. Such acceptable tolerance will, of course, vary depending upon the use to which the thermometer is to be put. Clinical thermometers, in particular, have rather small tolerances and I will mention these by way of example.

In a typical clinical thermometer the commercially acceptable tolerance is about ±0.2° F. which on a standard two inch scale is in the order of about ±0.03 of an inch. As a practical matter this tolerance will be obtained in delicate precision thermometers such as clinical thermometers if the stress after annealing, including cooling, is no more than about 10 pounds per square inch. However, in the preferred form of my invention, I have found it is easier to maintain the calibration of the thermometer after baking by so performing the annealing step that a lesser stress than the one above mentioned is maintained, to wit, by carrying the annealing out still further, so that the stress remaining therein is so low that it is not even readable on present-day commercial polarizing instruments employed to measure stress in glass bodies. Such a stress is below 5 pounds per square inch. In other words, in the preferred form of my invention the annealing step is so practiced that the stress is relieved to less than 5 pounds per square inch and, thereafter, the baking step is so practiced as not to substantially increase or decrease this stress, and in any event, not to change the calibration of the scale by more than a commercially acceptable tolerance.

To better illustrate this phase of my invention I will set forth below two sets of heat treatments for annealing and baking both of which will provide commercially acceptable calibrations after baking, one of these being at the high end of the tolerance and the other at the low end. However, I wish to emphasize that, despite the fact that I have given specific examples for a clinical thermometer, my invention is not to be so limited thereto; nor are the temperatures, times and rates which I am about to give the only ones that are suitable or are the extremes for clinical thermometers.

*Example I*

The clinical thermometer whose heat treatment is about to be described is made from a Corning Normal lead thermometer glass. The same treatment applies, regardless of whether the bulb is of the oral, rectal or stubby type. The length of the entire thermometer is between 4 and 4⅛ inches.

For annealing, the thermometer is heated from room temperature to 860° F. ±3° F. in 15 minutes. It is held at this temperature for three hours. It then is cooled for one hour at a rate of 70° F. per hour to 790° F. At this point the thermometer is in the stress range and is about to pass through it. It is, therefore, now cooled more slowly and, specifically, from 790° F. to 750° F. at a rate of 40° per hour. At 750° F. the thermometer is at the lower end of the stress range. Nevertheless, great care still should be exercised to prevent the creation of stress. Therefore, the thermometer now is cooled for the next three hours at a rate of 70° F. per hour to 500° F. After this it may be exposed to the ambient temperature.

A thermometer so annealed is, after scale setting, removal of the expansion and calibration pocket, formation of the expansion chamber, calibration, pointing and deposit of the heat-decomposable staining composition, now baked as follows:

It is raised from room temperature to 760° F.±3° F. in a period of fifteen minutes. This is near the lower end of the stress range. It is held at 760° F. for forty minutes and then is cooled down to 500° F. at a rate of 70° F. per hour. It will be found that the stained-in graduations thus formed will, upon rechecking, be within the commercially acceptable tolerance, although at the lower end thereof. More particularly, the stained-in calibrations will be approximately 0.2° F. above the mercury column at any point over the full length of the scale.

*Example II*

The same thermometer is employed.

For annealing, the thermometer is heated from room temperature to 860°±3° F. in fifteen minutes. It is held at this temperature for sixty minutes. It then is cooled for five hours at a rate of approximately 70° F. per hour to 500° F. Attention is called to the fact that I have moved through the stress range somewhat more rapidly and thereby have imparted a slightly greater stress than in Example I. However, this stress is within the preferred limit mentioned above, that is to say, less than five pounds per square inch. After this, it may be exposed to the ambient atmosphere. A thermometer so annealed is, after scale setting, removal of the expansion and calibration pocket, formation of the expansion chamber, calibration, pointing and deposit of the heat-decomposable staining composition, now baked as follows:

It is raised from room temperature to 775° F.±3° F. in a period of fifteen minutes. It is held at 775° F. for twenty-five minutes and then is cooled down to 500° F. at a rate of 70° F. per hour. It is to be observed that the baking procedure in this Example II improves the annealing of the thermometer and slightly increases the relief of the stress in the glass. However, the relief is not so great as to affect the calibration within 0.2° F. It will be found that the stained-in graduations thus formed will, upon rechecking, be within the commercially acceptable tolerance, although near the upper end thereof. More particularly, the stained-in calibrations will be approximately 0.2° F. below the mercury column at any point over the full length of the scale.

Up to this point the invention has been described in its general aspects and will be seen to consist broadly in providing with an expansion and calibration pocket at its distal end, a thermometer shaft which contains mercury and includes a thin-walled reservoir bulb at its proximate end, then annealing the thermometer at a rate slow enough so that the thermometer after cooling has a stress not in excess of 10 pounds per square inch, then "setting" the scale by running the excess mercury into the pocket, removing the pocket, forming the expansion chamber, subsequently pointing the thermometer, thereafter using the points as guides to apply properly spaced and located scale graduations and numerical markings to the thermometer, next heating the thermometer to a temperature below the stress temperature of the glass so as to cause a penetration stain marking to be effected and finally removing the expansion chamber. The invention also includes within its compass the use of a particular method and apparatus for applying the scale graduation and numerical markings which comprise the stencilled heat decomposable matrix composition. The reason for the use of a special method and apparatus is that, as previously indicated, the thermometers in a batch will not have uniform scale lengths after annealing. That is to say, after annealing it will be found that the location of the points on different thermometers will vary and that the spaces between the points on different thermometers will vary. Heretofore with etched markings such variations have been compensated for through the use of a pantographic apparatus which scraped the wax (resist coating) off at adjustable properly spaced intervals; but this took considerable skill and time on the part of an expert operator. The present invention accomplishes an equivalent result with a far simpler apparatus and method.

Pursuant to this sophisticated embodiment of my present invention a batch of annealed and pointed thermometers, each of which has an expansion chamber, is separated into several groups each of which has a different common range of spaces between the points. Typically the maximum difference of the spaces between the points of a batch is about three-tenths of an inch. Therefore, in carrying out my present invention each of the groups into which the thermometers are separated will contain within it thermometers having a spacing between the points of less than three-tenths of an inch and preferably of a simple fraction of three-tenths of an inch, that is to say a fraction of which the numerator is unity and the denominator is an integral, i.e., whole, number. It will be seen that it is not necessary to have too many groups. An arrangement which has worked out well employs three such groups and, as will be apparent from the foregoing, the spacing between the points in each of the groups varies by up to one-tenth of an inch. Thus in the first group the spacing between the points will be in the range from X" to X"+0.1", the spacing between the points in the second group will be from X"+0.1" to X"+0.2" and the spacing between the points of the thermometers in the third group will be from X"+0.2" to X"+0.3", where X is the smallest acceptable spacing, in inches, between the points.

Thereafter, the thermometers within each group are further separated into sub-groups. A suitable number of sub-groups for each main group is ten so that the variation between spaces of points in successive sub-groups will be 0.01". A lesser number of sub-groups can be used depending upon the skill of operators who can be obtained in a given locality. The fineness of the distinctions between any two sub-groups of a main group should not be so small as to be not visually observable to an operator or, phrased differently, an operator should be able to determine by eye upon placement of a thermometer whose points lie within a given subgroup against a thermometer whose points lie within an adjacent sub-group that the points of the two thermometers are spaced apart differently.

Pursuant to an ancillary feature of the present invention the annealed pointed sub-grouped shafts which are reservoir bulbed at one end and expansion chambered at the other end have expeditiously and rapidly applied thereto the staining heat decomposable matrix composition by the use of an apparatus and method which now will be described.

The apparatus is denoted by the reference numeral 26 and is shown in FIGS. 1–6. In essence, it constitutes a silk screen stenciling machine of a novel design which is adapted rapidly to effect the deposit of a staining ink on the three semi-flat faces of a thermometer shaft with the scalar and numerical graduations thereof properly positioned with respect to the temporary markings, i.e. points, 18.

Figure 1:
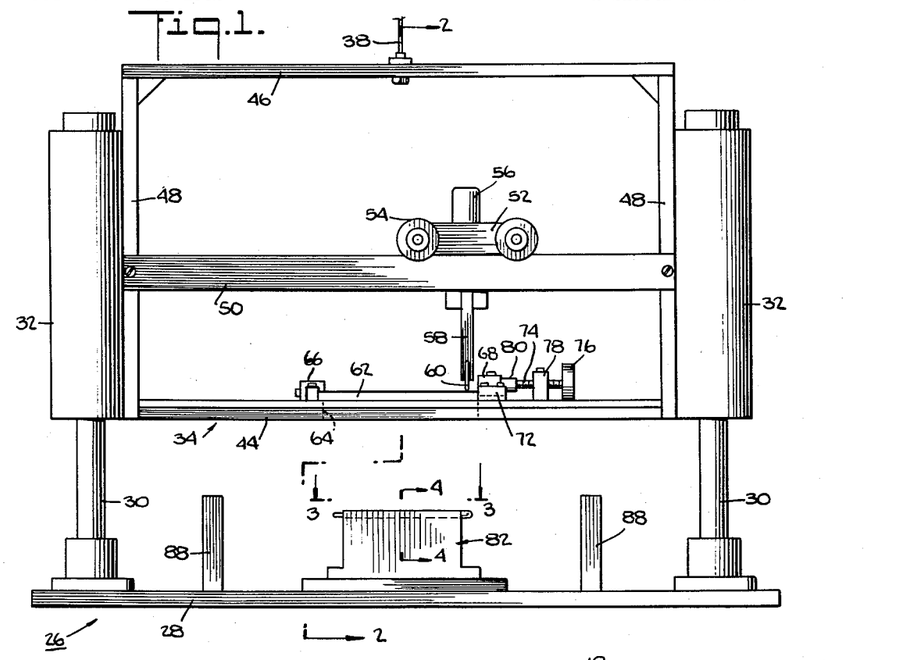
FIG. 1 is a front elevational view of an apparatus employed pursuant to my present invention to apply a staining composition in the form of marks to be effected through a stencil screen to thermometers.

Said apparatus includes a base 28 from which a pair of cylindrical posts 30 extend upwardly. Bearings 32 are slidable on the posts and said bearings support between them a frame 34. The frame and all of the parts carried thereby are counterbalanced by a weight 36 secured to one depending end of a cable 38 which is trained about a pair of pullys 40, 42 and has its other depending end connected to the frame (see FIG. 2). The frame includes a horizontal bottom plate 44, a horizontal top plate 46 to which the cable 38 is attached and a pair of vertical side plates 48 which carry the bearings 32. Spanning the space between the side plates are a pair of horizontal rails 50 on which a carriage 52 is mounted to ride by means of rotatable wheels 54. A vertical shaft 56 is slidably supported on the carriage 52 in a fashion such as to permit free vertical movement thereof between limits. Said shaft supports a squeegee holder 58 at its lower end and on the lower edge of said holder there is provided a flexible squeegee blade 60. Thus by traversing the carriage 52 between the side plates the squeegee blade may be made to sweep along a horizontal path and said blade may be raised above said path by elevating the shaft 58 at the opposite ends of its stroke.

A stencil screen 62 is supported in horizontal position on the bottom plate 44 directly over a large aperture 64 therein. The screen comprises fabric, i.e. cloth having warp threads and woof strands. The cloth is treated in the usual fashion, e.g. by a photosensitive method, to make the required stencil. For example, the cloth is coated with a hardenable material containing photosensitive particles distributed throughout, then the cloth is exposed to light which has been modulated by the pattern of the stencil to be formed. Where the unmodulated light strikes the photo-sensitive particles the coating material is insolubilized. Thereafter the coating material is treated with a solvent which washes away the soluble portions so as to expose the cloth. Thus the stencil when ready for use comprises a cloth base in which the interstices are filled with an impervious imperforate coating or layer except for certain interruptions (pervious areas) where the original cloth is fully exposed. These pervious areas are in the shape of the markings to be made. The coating material is yieldable and elastic at least to a slight extent. Moreover, the material of which the cloth is made is elastic, i.e. resilient, at least to some extent so that the cloth stencil can be stretched and so that it can resume its original shape after the stretching force is released. For example, the cloth can be made from nylon (polyamide resin) monofilaments which are capable of being stretched and of resuming their original shape after the stretching is removed. Excellent results are secured where the cloth is between 100 and 300 mesh. It should be pointed out that this particular material has been mentioned only by way of example. Alternatively, there may be employed any of the standard cloths used for screen stenciling, e.g. silk, however the filming material used with the cloth should be capable as noted above of a yielding elastic action and together with the cloth should be capable of being restored to its original dimension upon release of the strain which caused its stretching.

In the embodiment of the present invention being described three stencil screens 62 are prepared, each stencil screen carrying three parallel linear sets of markings. The markings of each set correspond to the markings for the three sides of the thermometer shaft. Thus one set of markings will comprise the transverse scale graduation markings, another set will comprise the numerical graduation markings and a third set will comprise the informational markings such as the name, trade-mark or symbol of the manufacturer or distributor. The scalar and numerical markings for each of the three different stencil screens 62 in the example being described will be spaced to correspond to the points of the thermometers in the shortest sub-group of each of the three principal groups so that if these markings should be transferred to the thermometers in such sub-groups they will correctly apply the markings with respect to the points providing that the silk screen markings and the points previously have been registered.

The stencil screen is so mounted that it can be controllably stretched parallel to the lengths of the sets of markings. Thus one end of the stencil screen 62 is anchored, as by a fabric clamp 66, located adjacent one end of the aperture 64. This anchor is stationary, that is to say, it is rigidly fixed to the bottom plate 44. The other and opposite end of the stencil screen, which screen is elongated in the direction of the lengths of the sets of markings, is gripped between a pair of vise jaws 68, 70, said jaws jointly acting to firmly hold this other end of the stencil screen. The jaws 68, 70 are jointly slidable between a pair of horizontal gibs 72 so that said jaws can be moved toward and away from the fabric clamp 66.

Suitable means is included to control the aforesaid movement of the jaws 68, 70. Thus in the apparatus 26 here being described said means includes a threaded shaft 74 having a manipulating disc 76 at one end thereof. The shaft is mounted to turn freely in a bearing 78 secured to the bottom plate 44. Although the shaft is free to turn in the bearing it is restrained against longitudinal movement. This may be accomplished by providing C-rings on the shaft which are snug in annular grooves in the shaft and which lightly press against opposite faces of the bearing 78 or, as shown herein, by providing the bottom plate 44 with a slot that is perpendicular to the shaft 74 and in which the perimeter of the disc 76 snugly rides. Desirably said disc is provided with graduations adapted to be read against an index mark on the bottom plate. The end of the shaft 74 remote from the disc 76 is screwed in a tapped hub 80 functionally integral with the jaw 68. Thus, by turning the disc the jaws can be moved either toward or away from the fabric clamp. This permits the stencil screen 62 secured between the clamp and jaws to be controllably stretch or released. Both the clamp and jaws hold the stencil screen flat and horizontal and the pull exerted on the screen when the jaws are moved away from the clamp is exerted parallel to the length of the screen and substantially uniformly across its width.

Figure 3:
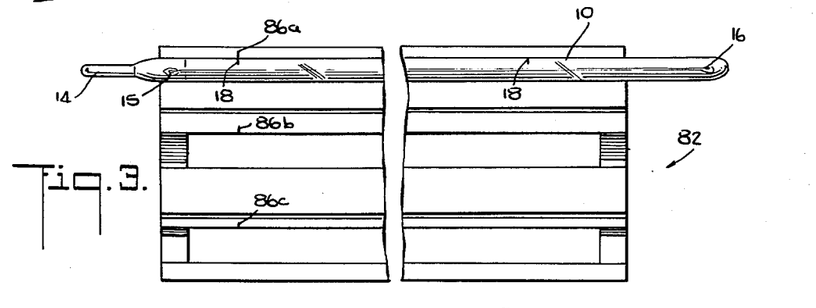
FIG. 3 is an enlarged top view of the jig for holding thermometers during the application of the staining composition, the same being taken substantially along the line of 3—3 of FIG. 1.

The apparatus 26 further includes a thermometer shaft holder 82, i.e. a jig, rigidly supported on the base 28. Optionally the jig is subdivided into three sub-jigs 82a, 82b, 82c which may be independent of one another and each of which in such case is secured, as by bolting, to the base 28.

The purpose of the jig is to support thermometer shafts during the stenciling operation. To this end each sub-jig 82a, 82b, 82c is provided with an oversize elongated groove 83 on its upper face. The three grooves are parallel to one another and parallel to the direction of movement of the squeegee blade. Each groove is wider and deeper than a thermometer shaft so as to avoid smudging of a wet stencil-applied marking. The ends 84a, 84b, 84c of all the grooves are smaller in cross-section than the oversize grooves and are shaped to support a thermometer shaft with a different certain side uppermost in each groove. Thus if a thermometer shaft is placed in any one of the grooves a predetermined side will be uppermost and this side will be different for each of the three grooves. The length of the jig is less than the length of a thermometer so that when a thermometer is placed therein ready for screening the reservoir bulb will overhang one end and the expansion chamber will overhang the other end as shown in FIGS. 3 and 6. The space between the smaller ends of the grooves exceeds the length of the stencil markings to be applied.

In the preferred form of my invention the sub-jig 82a will hold uppermost the semi-flat side of the thermometer which has been pointed and which will ultimately have applied thereon the transverse scale of graduation markings. The sub-jig 82b will hold uppermost the semi-flat side of the thermometer which ultimately will have applied thereon the numerical markings. The sub-jig 82c will hold a thermometer with the semi-flat side uppermost which ultimately will have applied thereon the informational material such as the manufacturer's name.

The sub-jig 82a has a registry mark 86a provided on its upper surface. Said mark, for example, may constitute a narrow transverse groove filled with pigment. Similar marks 86b, 86c may be provided on the remaining sub-jigs although these are not absolutely essential.

Finally the apparatus includes vertical stop plates 88 adapted to abut the underside of the bottom plate 44 when the frame 34 and bearings 32 have been lowered into proper position for the stencil screen 62 to be lightly pressed against thermometers supported on the sub-jigs 82a, 82b, 82c.

To deposit staining composition markings on thermometers using the apparatus 26, a given group of thermometers, including all of its subgroups, is brought to said apparatus. Said apparatus has inserted therein that stencil screen 62 which has the three parallel linear sets of stencil markings the lengths of which are proper for the subgroup having the shortest distance between the points 18. The disc 76 is adjusted so that the distance on the stencil screen between the specific scalar temperature graduations corresponding to the temperatures of the points 18 is exactly equal to the distance on the thermometer shafts between said points 18 of the aforesaid subgroup. The sub-jigs 82a, 82b, 82c are jointly adjusted on the base 28 so that the registry marks 86a, 86b, 86c are exactly in registry with the proper mark on the scalar graduation of the stencil screen. For example, if the point 18 corresponds to 98° F. the scalar graduation marking for 98° F. on the stencil would be brought into registry with the marking 86a. One unmarked thermometer shaft now is placed in the sub-jig 82a and its lower point 18 is aligned with the registry mark 86a. At this time the other point 18 should be in registry with the mark of the corresponding temperature on the stencil screen, e.g. 104° F. This can be checked by lowering the frame 34 and observing if the proper registry is present. If not the disc 76 is manipulated to secure the desired registry. The apparatus now is ready for operation.

A stencil ink containing the staining compound is placed on top of the stencil screen and the blade is given a few passes back and forth across the screen, the blade being raised adjacent each end of the screen to clear the pool of stencil ink. The screen is lowered until it contacts the thermometer lying on the first sub-jig 82a and the squeegee blade is passed once or twice across the stencil screen. This will express the staining ink through the unfilled parts of the screen onto the uppermost side of the thermometer in the sub-jig 82a. The frame 34 is raised, the marked thermometer is turned 120° and transferred to the sub-jig 82b with the wet newly marked side located in the oversize groove 83 and a virgin side now uppermost. A fresh unmarked thermometer is placed in the sub-jig 82a with the proper side uppermost. The frame is again lowered and the squeegee blade again moved across the surface of the screen. This will place a scalar graduation marking on the thermometer in the sub-jig 82a and a numerical graduation marking on the thermometer in the sub-jig 82b. The frame is raised and the two wet marked thermometers are turned 120° each and advanced one sub-jig each while a fresh thermometer is placed on the sub-jig 82a. When the frame is lowered for the third time and the squeegee blade passed across the screen three thermometers will be marked at once, one with the screen scalar graduations, one with the screen numerical markings and one with the screen manufacturer's marking. This process is rapid, the thermometers being moved in progression from sub-jig to sub-jig and turned 120° as this is done until all of the thermometers of the subgroup have been marked. It may be noted that the thermometers are located in proper longitudinal positions in the sub-jigs 82b and 82c by use of the registry marks 86b, 86c.

After a subgroup has been marked, a thermometer of the next subgroup is placed in the sub-jig 86a and the disc 76 turned to stretch the stencil screen slightly—enough so that the set of scalar graduation markings will be lengthened sufficiently to correspond to the points 18 of this next subgroup. Thereupon all of the thermometers in this next subgroup are progressively marked as indicated above. The process is repeated for all of the thermometers in all of the subgroups of a given group. For each of the next two groups a different stencil screen is substituted for the stencil screen used to mark the first group.

Before starting the marking of a new batch of thermometers including a similar three groups, the stencil screens are released and permitted to resume their original sizes. That is to say, the stencil screens are restored to their shortest length. Where nylon cloth is employed the restoration is comparatively slow, but it may be speeded up by wetting the stencil screen or steaming it or spraying water on it.

It will be understood that after the staining ink markings have been placed on the thermometers the same are raised to staining temperature in an oven or muffle in the manner described hereinabove, and that after staining the expansion chamber is removed, likewise as described above.

It thus will be seen that I have provided a thermometer and a method and apparatus for making the same which achieve the various objects of my invention and which are well adapted to meet the conditions of practical use.

As various possible embodiments might be made of the above invention and as various changes might be made in the embodiment above set forth, it is to be understood that the article, process and apparatus described above and shown in the accompanying drawings are to be considered as illustrative and not in a limiting sense.

Having thus described my invention, I claim as new and desire to secure by Letters Patent:

1. A glass thermometer comprising a shaft having a sealed capillary bore therein, a reservoir bulb at an end thereof connected to said bore, a heat expansible liquid in said bulb and extending partially into said bore, and stained scalar graduation markings extending over a substantial length of said shaft, said markings being in surface portions of said shaft that are flush with the surrounding unstained portions of said shaft, the finished thermometer being uniformly annealed over the full length of the bulb and full length of the contiguous portion of the shaft including the entire stain marked length thereof, said portions of the thermometer being thereby free from stresses caused by local high temperature.

2. A glass thermometer comprising a shaft having a sealed capillary bore therein, a reservoir bulb at an end thereof connected to said bore, a heat expansible liquid in said bulb and extending partially into said bore, and stained scalar graduation markings extending over a substantial length of said shaft, said markings being in surface portions of said shaft that are flush with the surrounding unstained portions of said shaft, the finished thermometer being annealed to a residual stress not in excess of ten pounds per square inch over the full length of the bulb and full length of the contiguous portion of the shaft including the entire stain marked length thereof, said portions of the thermometer being thereby free from stresses caused by local high temperature.

3. A glass thermometer comprising a shaft having a sealed capillary bore therein, a reservoir bulb at an end thereof connected to said bore, a heat expansible liquid in said bulb and extending partially into said bore, and stained indicia markings extending over a substantial length of said shaft, said markings being in surface portions of said shaft that are flush with the surrounding unstained portions of said shaft, the finished thermometer being uniformly annealed over the full length of the bulb and full length of the contiguous portion of the shaft including the entire stain marked length thereof, said portions of the thermometer being thereby free from stresses caused by local high temperature.

4. A glass thermometer comprising a shaft having a sealed capillary bore therein, a reservoir bulb at an end thereof connected to said bore, a heat expansible liquid in said bulb and extending partially into said bore, and stained indicia markings extending over a substantial length of said shaft, said markings being in surface portions of said shaft that are flush with the surrounding unstained portions of said shaft, the finished thermometer being annealed to a residual stress not in excess of ten pounds per square inch over the full length of the bulb and full length of the contiguous portion of the shaft including the entire stain marked length thereof, said portions of the thermometer being thereby free from stresses caused by local high temperature.

5. A glass clinical thermometer comprising a shaft having a capillary bore therein, a thin-walled reservoir at one end of the shaft, a trap in the shaft connecting the reservoir bulb to the capillary bore, an expansion chamber at the other end of and communicating with the bore, a heat expansible liquid in the reservoir bulb and extending partially into said bore, and stained scalar graduation markings extending over a substantial length of said shaft, said markings being in surface portions of said shaft that are flush with the surrounding unstained portions of said shaft, the finished thermometer being uniformly annealed over the full length of the bulb and full length of the contiguous portion of the shaft including the entire stain marked length thereof, said portions of the thermometer being thereby free from stresses caused by local high temperature.

6. A glass clinical thermometer comprising a shaft having a capillary bore therein, a thin-walled reservoir at one end of the shaft, a trap in the shaft connecting the reservoir bulb to the capillary bore, an expansion chamber at the other end of and communicating with the bore, a heat expansible liquid in the reservoir bulb and extending partially into said bore, and stained scalar graduation markings extending over a substantial length of said shaft, said markings being in surface portions of said shaft that are flush with the surrounding unstained portions of said shaft, the finished thermometer being annealed to a residual stress not in excess of ten pounds per square inch over the full length of the bulb and full length of the contiguous portion of the shaft including the entire stain marked length thereof, said portions of the thermometer being thereby free from stresses caused by local high temperature.

References Cited by the Examiner
UNITED STATES PATENTS

| | | | |
|---|---|---|---|
| 626,124 | 5/99 | Yankauer | 73—371 |
| 1,592,429 | 7/26 | Kraus | 73—371 |
| 2,014,373 | 9/35 | Brickell | 101—126 |
| 2,651,202 | 9/53 | Burns | 73—371 |
| 2,658,837 | 11/53 | Blackman | 117—37 |
| 2,707,688 | 5/55 | Blackman | 117—37 |
| 2,712,237 | 7/55 | Margolis | 73—371 |
| 2,713,821 | 7/55 | Palczewski | 101—126 |
| 2,811,040 | 10/57 | Blackman | 65 |

ISAAC LISANN, *Primary Examiner.*

Disclaimer

3,172,289.—*Seymour N. Blackman*, Englewood, N.J. GLASS THERMOMETER. Patent dated Mar. 9, 1965. Disclaimer filed May 17, 1972, by the inventor.

Hereby enters this disclaimer to claims 2, 4 and 6 of said patent.

[*Official Gazette January 2, 1973.*]